United States Patent
Orsini

(10) Patent No.: US 12,381,415 B2
(45) Date of Patent: Aug. 5, 2025

(54) GRID TELEMETRY FINGERPRINT

(71) Applicant: LO3 Energy Inc., San Francisco, CA (US)

(72) Inventor: Lawrence Orsini, San Francisco, CA (US)

(73) Assignee: LO3 Energy Inc., San Francisco, CA (US)

( * ) Notice: Subject to any disclaimer, the term of this patent is extended or adjusted under 35 U.S.C. 154(b) by 0 days.

(21) Appl. No.: 18/389,255

(22) Filed: Nov. 14, 2023

(65) Prior Publication Data

US 2024/0348084 A1    Oct. 17, 2024

Related U.S. Application Data

(63) Continuation of application No. 17/833,169, filed on Jun. 6, 2022, now Pat. No. 11,862,971, which is a continuation of application No. 16/998,088, filed on Aug. 20, 2020, now Pat. No. 11,355,960, which is a continuation of application No. 16/108,263, filed on Aug. 22, 2018, now Pat. No. 10,784,715.

(51) Int. Cl.
*H02J 13/00* (2006.01)
*H02J 3/38* (2006.01)
*H04Q 9/06* (2006.01)

(52) U.S. Cl.
CPC ........ *H02J 13/00001* (2020.01); *H02J 3/381* (2013.01); *H02J 13/00007* (2020.01); *H02J 13/00018* (2020.01); *H04Q 9/06* (2013.01)

(58) Field of Classification Search
CPC ........... H02J 13/00001; H02J 13/00018; H02J 13/00007; H02J 3/38; H02J 3/381; H02J 13/00; H04Q 9/06
See application file for complete search history.

(56) References Cited

U.S. PATENT DOCUMENTS

| | | | |
|---|---|---|---|
| 8,583,520 B1 | 11/2013 | Forbes, Jr. | |
| 9,118,207 B2 | 8/2015 | Shudark et al. | |
| 10,784,715 B2 | 9/2020 | Orsini | |
| 11,355,960 B2 * | 6/2022 | Orsini | H02J 13/00007 |
| 11,862,971 B2 | 1/2024 | Orsini | |
| 2017/0357828 A1 | 12/2017 | Phillips | |
| 2020/0067344 A1 | 2/2020 | Orsini | |
| 2020/0381938 A1 | 12/2020 | Orsini | |
| 2022/0302749 A1 | 9/2022 | Orsini | |

* cited by examiner

*Primary Examiner* — Robert L Deberadinis
(74) *Attorney, Agent, or Firm* — Fish & Richardson P.C.

(57) ABSTRACT

Methods, Systems, and Computer program products can use grid telemetry to generate a fingerprint. One of these methods includes generating a first grid telemetry fingerprint based on characteristics of an electrical grid. The method also includes verifying a transaction based on the first grid telemetry fingerprint and a second grid telemetry fingerprint associated with the transaction.

17 Claims, 7 Drawing Sheets

GRID TELEMETRY FINGERPRINT

RELATED APPLICATIONS

This application is a continuation and claims the benefit of priority under 35 USC 120 of U.S. application Ser. No. 17/833,169, filed on Jun. 6, 2022, which is a continuation of U.S. application Ser. No. 16/998,088, filed on Aug. 20, 2020 (U.S. Pat. No. 11,355,960), which is a continuation of U.S. application Ser. No. 16/108,263, filed on Aug. 22, 2018 (U.S. Pat. No. 10,784,715), the contents of which are incorporated herein in their entirety by reference.

BACKGROUND

Electricity is generated at power plants and moves through a complex system, sometimes called the grid, of electricity substations, transformers, and power lines that connect electricity producers and consumers. Most local grids are interconnected for reliability and commercial purposes, forming larger, more dependable networks that enhance the coordination and planning of electricity supply.

In the United States, the entire electricity grid consists of hundreds of thousands of miles of high-voltage power lines and millions of miles of low-voltage power lines with distribution transformers that connect thousands of power plants to hundreds of millions of electricity customers all across the country.

SUMMARY

In general, one innovative aspect of the subject matter described in this specification can be embodied in methods that include the act of generating a first grid telemetry fingerprint based on characteristics of an electrical grid. The methods include the act of verifying a transaction based on the first grid telemetry fingerprint and a second grid telemetry fingerprint associated with the transaction.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The characteristics may be at least one of voltage, a phase angle difference, reactive power, and change in grid inertia. Verifying the transaction may include rejecting the transaction if the first grid telemetry fingerprint and the second grid telemetry fingerprint to not match. The methods may include excluding the sender of the transaction from subsequent communications for a predetermined time. The methods may include enabling a device to determine which blockchain cluster to join, based on the fingerprint. Generating the first grid telemetry fingerprint may include generating a hash of the characteristics of the electrical grid. Verifying the transaction may be part of a process by which the transaction is entered into a distributed ledger.

Other features and advantages will be apparent from the following description, including the drawings, and the claims.

BRIEF DESCRIPTION OF THE DRAWINGS

Like reference numbers and designations in the various drawings indicate like elements.

DETAILED DESCRIPTION

The electricity that power plants generate is delivered to customers using the electrical grid including over transmission and distribution power lines. High-voltage transmission lines, like those that hang between tall metal towers, carry electricity over long distances to where consumers need it. Higher voltage electricity is more efficient and less expensive for long-distance electricity transmission. The electrical grid has been build for safety and reliability. However, recently there has been an increased concern that the electric grid is vulnerable to cyber attacks. Using grid telemetry to generate a grid telemetry fingerprint can be used to verify that information provided by entities on the electrical grid is actually coming from entities on the electrical grid and not being transmitted from some other location.

Figure 1:
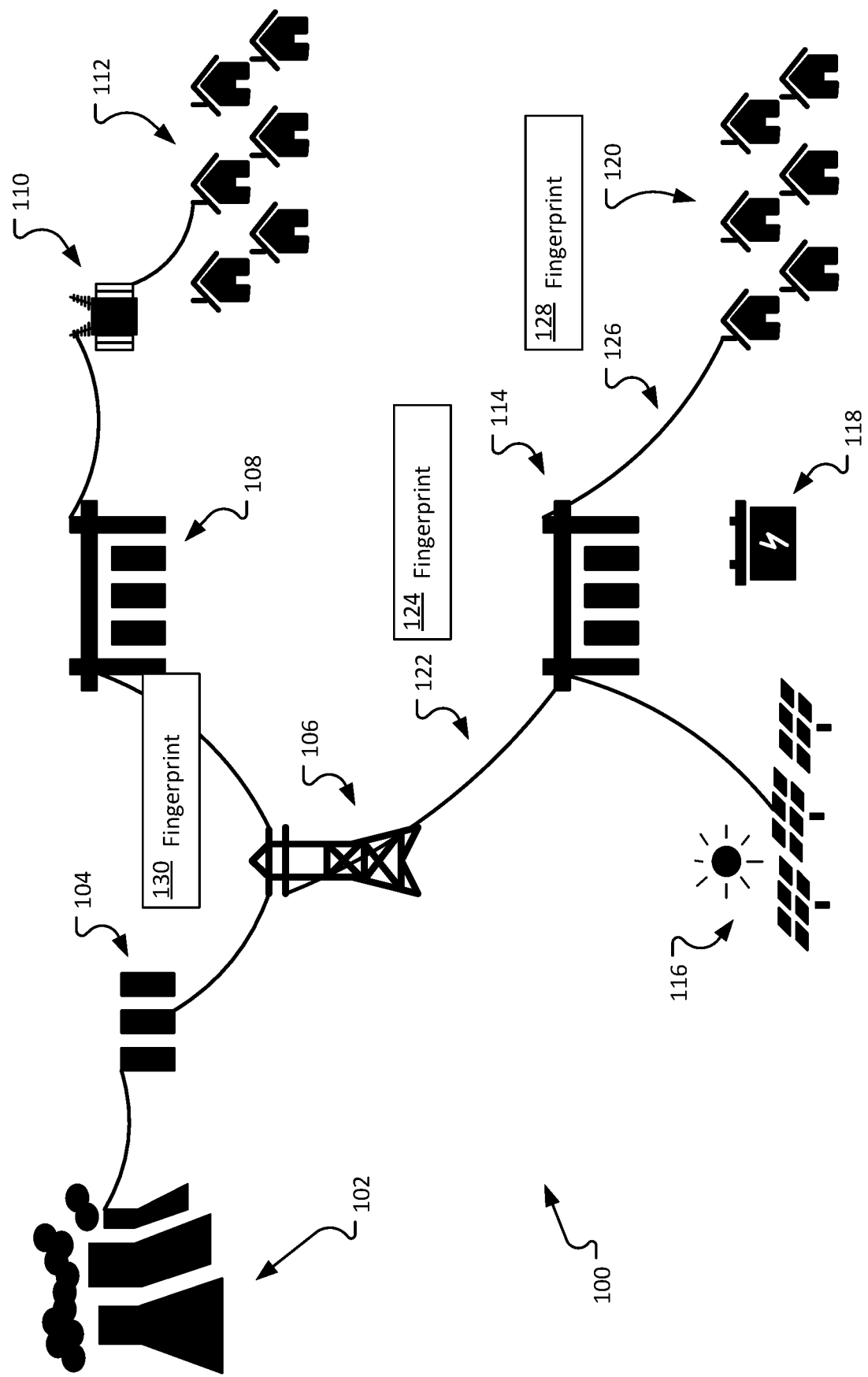
FIG. 1 is a diagram of some elements of an electrical grid.

FIG. 1 is a diagram of some elements of an electrical grid 100. The electrical grid 100 is an interconnected network for delivering electricity from producers to consumers. Electricity can be produced from centralized power plants 102 (including, for example, coal plants, nuclear plants, natural gas plants, hydro-electric plants, wind farms, solar arrays, and geothermal plants). Electricity can also be produced by decentralized facilities, such as solar panels 116 located on a consumers property (such as a roof).

Generally, centralized power plants 102 are located away from consumers. To transfer electricity from the power plants 102 to the consumers, the electricity is transferred at very high voltages (for example 155,000 volts or more). A step up transformer 104 increases the voltage of the electricity from the power plant. The high-voltage electricity is distributed over high voltage wires (represented by the tower 106). The high voltage electricity can be provided to substations (for example, substations 108, 114).

Generally, a substation steps down the voltage to distribution voltages (for example, less than 10,000 volts). The electricity is then deliverable to consumer areas (for example, consumer areas 112, and 120). Before it arrives at a consumer, the electricity may be processed by a transformer (such as transformer 110) to further reduce the voltage.

During the transmission of the electricity, the transmission characteristics can be measured, with substantially similar results, by any device on the same portion of the transmission path, but cannot be measured by devices not on the same portion of the transmission path. For example, any home within the consumer area 120 can measure these characteristics and each will measure substantially the same value. However, the same characteristics measured within consumer area 112 will have different values. Similarly, the substation 114 will measure the same values for the characteristics along the wire 126. While substations 108 and 114 measure the same values along with connection from the step up transformer 104 to the substations 108 and 114.

Some of these characteristics can include voltages, phase angle differences, reactive power numbers, changes in grid inertia, etc.

Voltage refers to the difference in electric potential between two points. Generally, voltage measurements are used to describe the voltage dropped across an electrical device (such as a resistor). The voltage drop across the device can be the difference between measurements at each terminal of the device with respect to a common reference point (or ground). The voltage drop is the difference between the two readings.

Phase angle differences is a measure of the difference in phase between two waves (e.g., of the same frequency) and referenced to the same reference (generally, between 0 and 360 degrees or 0 to $2\pi$ radians). In some implementations, time is sometimes used (instead of angle) to express position within the cycle of an oscillation.

Reactive power numbers is a measurement of the degree to which currents and voltages at the same frequency are out of phase. Reactive power is required to maintain voltage on motors and transformers and is often employed for the electrical grid. Further, switching power supplies in computers and TVs may draw current only during a part of the cycle, thus creating a net reactive load.

A change in grid inertia refers to the delay in power generation or the cease of power generation when a power source comes on line or goes off line, respectively. For example, coal plants use heavy turbines to generate electricity. When the plant is brought off line, it can take a considerable amount of time before the turbine stops spinning, and therefore stops generating electricity. Similarly, when the plant is brought offline it can take a substantial amount of time before the plant reaches full power production. Measuring grid inertia can include, for example, using techniques such as those implemented in GRIDMETRIX by REACTIVE TECHNOLOGIES.

When the system describes measuring changes in the measurable values (for example, change in grid inertia), changes may be measured over a predetermined period of time, for example, one second, two seconds, 10 seconds, etc.

Using these metrics, a grid telemetry fingerprint can be obtained for each section in the electrical grid. A grid telemetry fingerprint is a relatively short piece of data that can, for all practical purposes, uniquely identify a larger set of data. Grid telemetry fingerprints can be used, for example, as a proxy value for the larger data set, as described further below.

Generally, any device within the same section of the power grid can generate the same grid telemetry fingerprint at the same time. For example, the grid telemetry fingerprint 124, generated between the step up transformer 104 and the substation 114, is the same as the grid telemetry fingerprint 130, generated between the step up transformer 104 and the substation 108. However, the grid telemetry fingerprint 128, generated between the substation 114 and the consumers 120, is different than either grid telemetry fingerprint 124 or grid telemetry fingerprint 130.

It is also useful to note that the values that make up the grid telemetry fingerprint are not constant, but instead, can fluctuate from moment to moment (for example, changes to the grid inertia, phase angle, reactive power, and voltage may change from time to time). Accordingly, the grid telemetry fingerprint for any given section of a grid is changing frequently. In this manner, an attacker could not just sample the grid, or intercept an earlier grid telemetry fingerprint for reuse. Instead, only devices that are on the section of the grid for which the grid telemetry fingerprint is generated can generate the current grid telemetry fingerprint.

In some implementations, the grid telemetry fingerprint may be generated in a secure hardware component on a device. For example, the grid telemetry fingerprint may be generated and stored using cryptographically secured hardware such as a dedicated hardware chip, or as a component of another integrated circuit chip.

Figure 2:
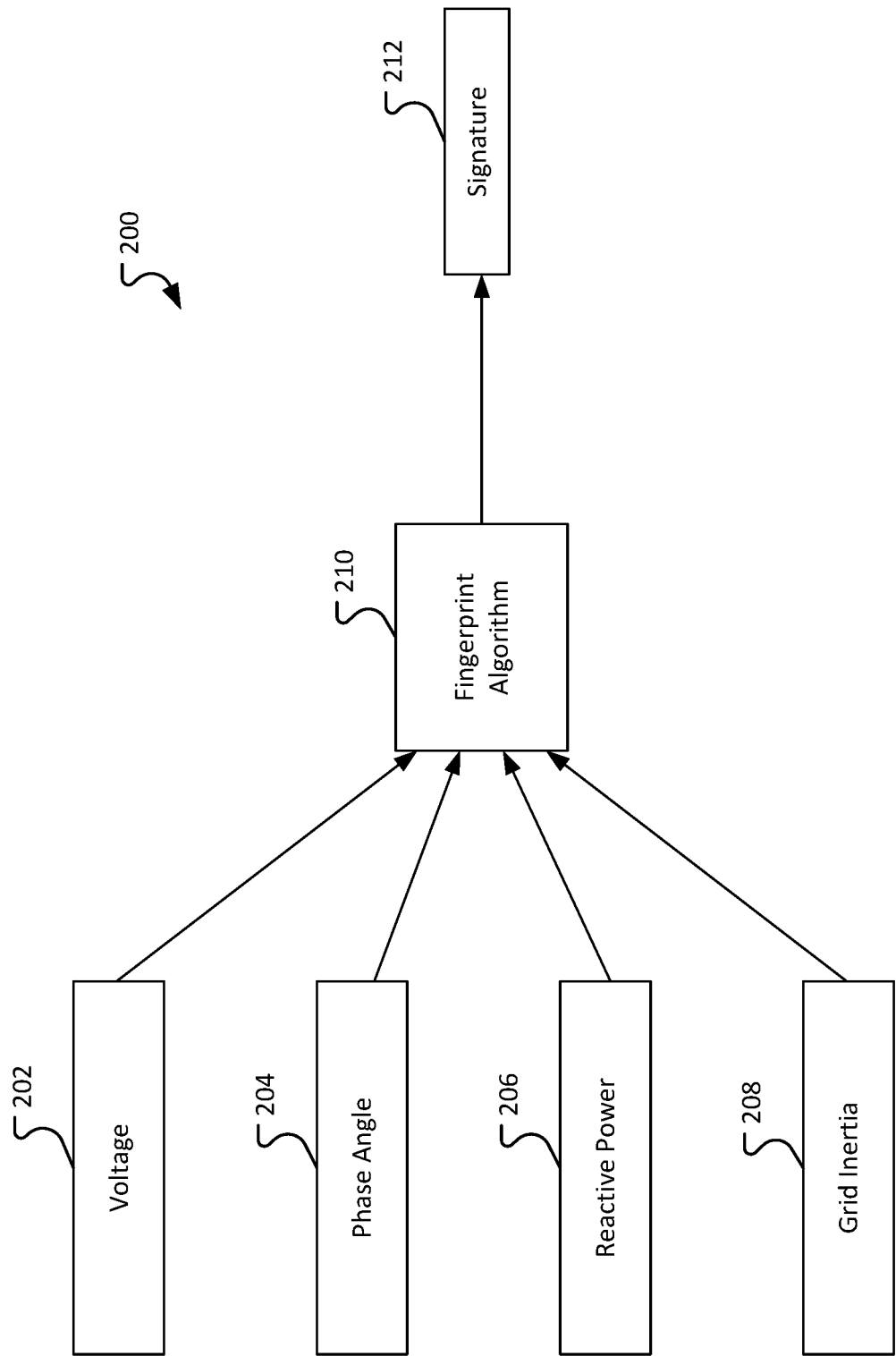
FIG. 2 illustrates generating a grid telemetry fingerprint from different metrics.

FIG. 2 illustrates generating a grid telemetry fingerprint from different metrics. A measured voltage 202, phase angle 204, reactive power 206, and grid inertia 208 (and/or changes in any of the above as measured across a predetermined period of time) can be provided to a grid telemetry fingerprint algorithm 210. The grid telemetry fingerprint algorithm 210 can accept various combinations of different values in order to generate a grid telemetry fingerprint. The grid telemetry fingerprint algorithm 210 applies functions to the provided values to produce a signature 212.

For example, in some implementations, the grid telemetry fingerprint algorithm 210 may apply one or more hash algorithms in order to transform the values provided into a signature. A hash algorithm is a function that can be used to map input data into a fixed size output. In general, a hash algorithm is deterministic, meaning that the same input into a hash algorithm will produce the same output. One feature of many hash algorithms is that once the output is generated the inputs used to generate the hash cannot be derived from the output. This feature makes it more difficult for a potential attacker to spoof the inputs and therefore the grid telemetry fingerprint.

In some implementations, the grid telemetry fingerprinting algorithm may preserve the relative values of the inputs so that a comparison within the margin of error may be performed. For example, two grid telemetry fingerprints generated using the grid telemetry fingerprint algorithm may be considered to be the same if the two grid telemetry fingerprint values are within a margin of error of each other.

One area in which the grid telemetry fingerprint may be used is in block chain provisioning.

Figure 3:
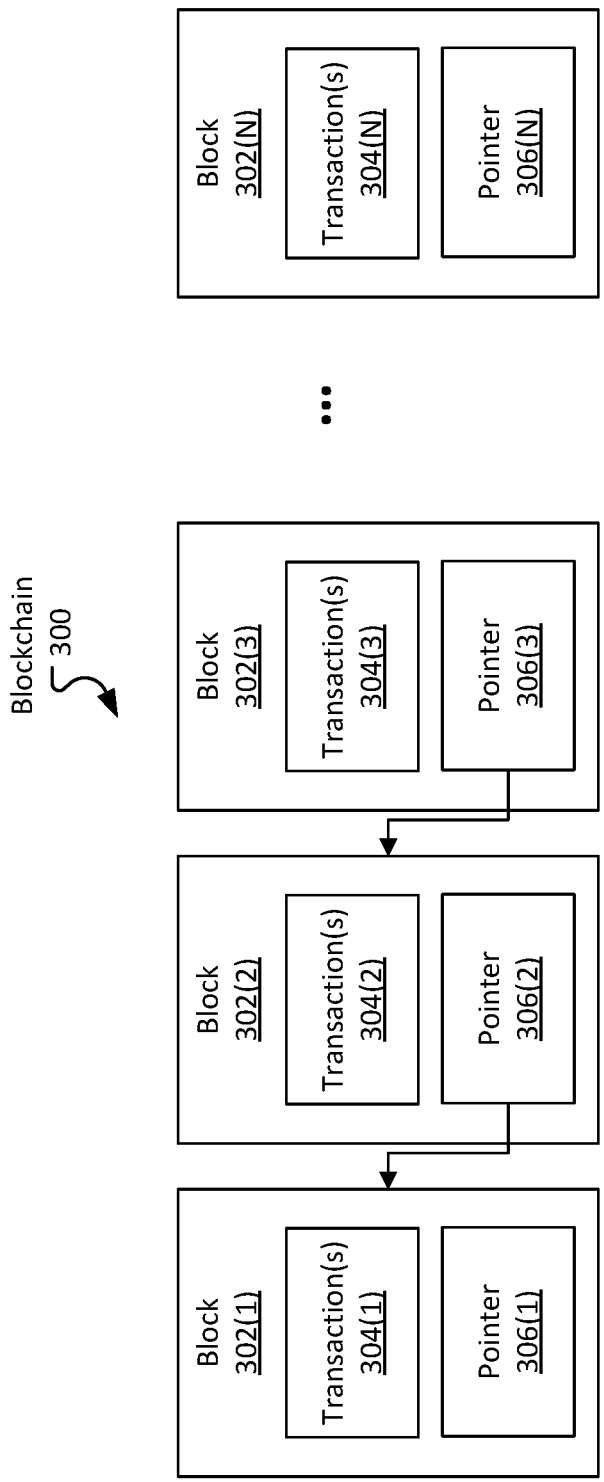
FIG. 3 depicts a schematic of an example blockchain.

FIG. 3 depicts a schematic of an example blockchain 200, according to implementations of the present disclosure. As shown in the figure, a blockchain 300 may include any number of blocks 302, in this example numbered 1 through N where N is any number. A block 302 may include, or be associated with a list of transaction(s) 304. The transaction(s) 304 may include the data stored in the blockchain 300, and each block 302 may store any number of records each indicating when and in what order the transaction(s) 304 are applied to modify the data stored in the blockchain 300. Each block 302 may also include a pointer 306 that identifies a previous (e.g., or next) block 302 in the blockchain 300.

To provide further context for the present disclosure, a high-level discussion of blockchain technology is provided. In general, a blockchain is a public ledger of all transactions that have ever been executed in one or more. A blockchain constantly grows as completed blocks are added with a new set of transactions. In some examples, a single block is provided from multiple transactions. In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Validation of the Blockchain can occur in several different ways, using different algorithms. Because all users need to know all previous transactions to validate a requested transaction, all users must agree on which transactions have actually occurred, and in which order. For example, if two users observe different transaction histories, they will be unable to come to the same conclusion regarding the validity of a transaction. The blockchain enables all users to come to an agreement as to transactions that have already occurred, and in which order. Two common schemes for validating blockchain transaction are referred to as proof of work and proof of stake.

In a proof of work validation scheme, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

In contrast, a proof of stake validation system relies on a participant in the blockchain to have an interest in the accuracy of the blockchain. The validators have to have a stake in the blockchain itself. In these systems, the right to add transactions to the blockchain is provided to validators based on the amount of currency or tokens that they have stored in the blockchain. Generally, the right to add a transaction to the blockchain is randomly or pseudo randomly assigned based on the size of stake of the validators.

Another validation system that can be used may rely on the grid telemetry fingerprint. In some implementations, a proof of participation validation enables any node that is able to produce the current grid telemetry fingerprint is able to act as a validator for that section of the grid. Validators may include a memory that enables the validator to track historical grid telemetry fingerprint for a period of time (for example, at least the length of time it takes to validate an entry on the distributed ledger).

In some cases, the distributed ledger system can include one or more sidechains. A sidechain can be described as a blockchain that validates data from other blockchains. In some examples, a sidechain enables ledger assets (e.g., a digital currency) to be transferred between multiple blockchains.

In some implementations, a grid telemetry fingerprint may be used to identify which blockchain cluster a particular device should join.

Figure 4A:
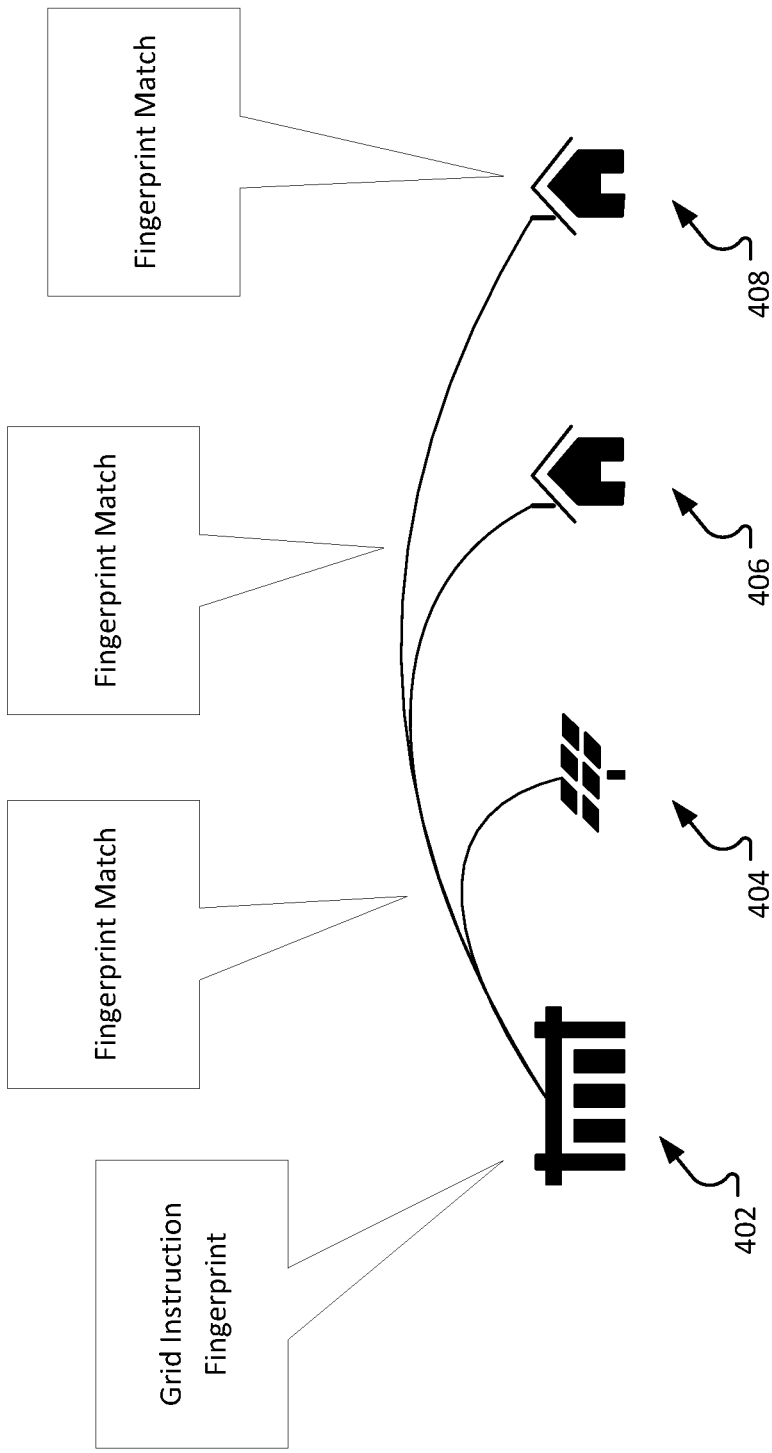
FIGS. 4A-B illustrates an example of approving and rejecting a transaction based on a grid telemetry fingerprint.

FIG. 4A illustrates an example of approving a transaction based on a grid telemetry fingerprint. The validation mechanism may include validating a transaction based on the grid telemetry fingerprints.

Accompanying the grid instruction is the grid telemetry fingerprint, as determined by the substation 402. Other block chain clients along the same line compare the grid telemetry fingerprint provided by the substation to their own grid telemetry fingerprint. For example, a solar array 404, a consumer 406 and a consumer 408 each compare the grid telemetry fingerprint to their own calculated grid telemetry fingerprint. In this example, the grid telemetry fingerprints match and the instruction or information is validated and added to the block chain ledger. In this manner, each actor on the part of the grid is capable of validating that the instruction or information came from the same part of the grid. In some implementations, validating the grid telemetry fingerprint may be performed as part of another consensus mechanism of the distributed ledger (such as proof of work, proof or stake, etc.)

Figure 4B:
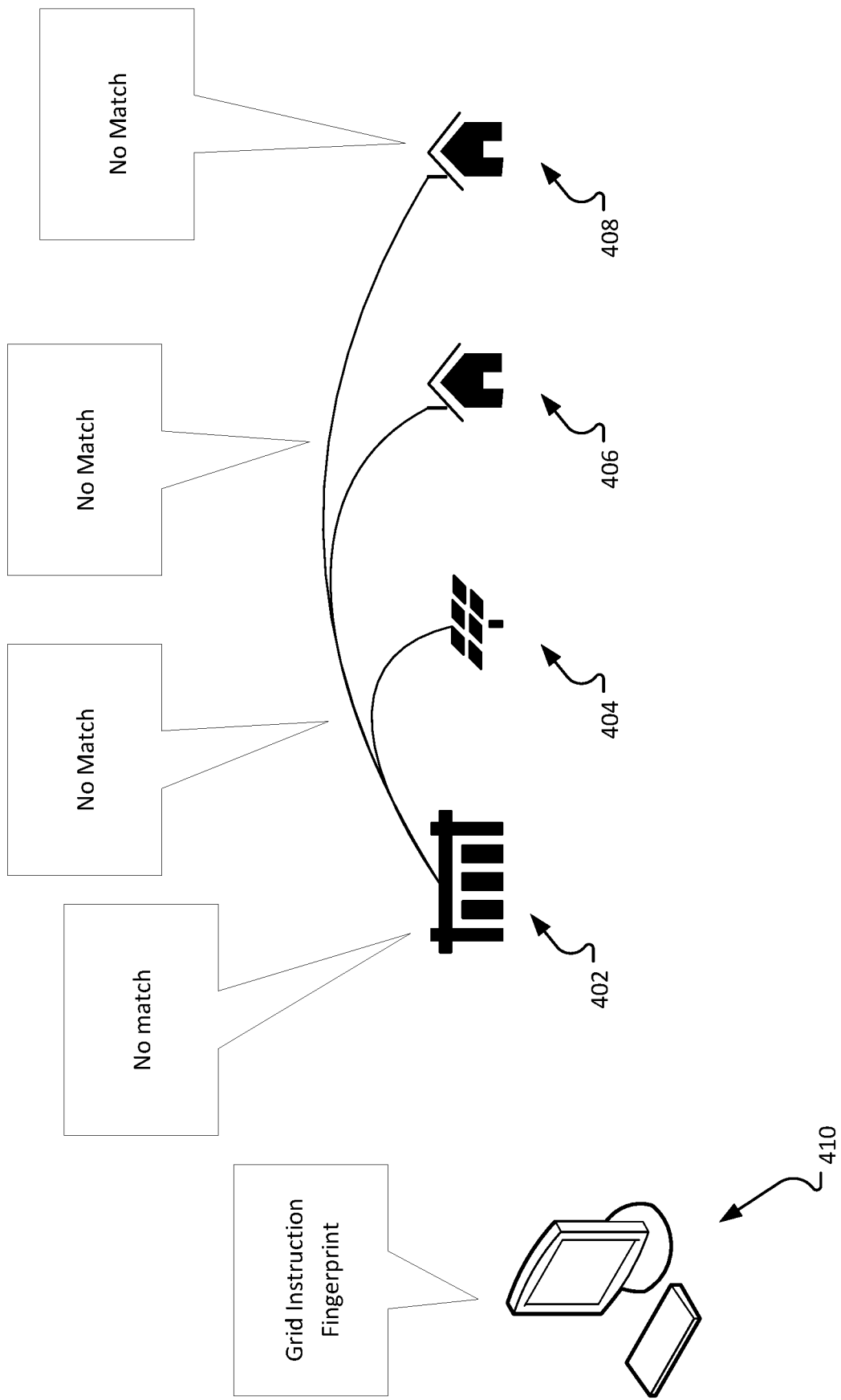

FIG. 4B illustrates an example of rejecting a transaction based on a grid telemetry fingerprint. In this example, a third party 410 (that is not located in the section of the grid that they are trying to manipulate) issues a grid instruction or information along with the grid telemetry fingerprint. As discussed above, the grid telemetry fingerprint generated by two different parts of the grid will necessarily be different. Accordingly, the substation 402, the solar array 404, the consumer 406, and the consumer 408 each report that the grid telemetry fingerprint does not match. Accordingly, the grid instruction is rejected. In some implementations, the third-party may be barred from further interactions with the block chain, or may be barred from further actions with the block chain for a predetermined period of time.

In this manner, third parties that are not part of the electrical grid are prevented from manipulating the electrical grid by issuing fraudulent instructions or information. Further, and some implementations, the value of the grid telemetry fingerprints change frequently enough that it is practically impossible for a third party to obtain the grid telemetry fingerprint and use it to inject instructions before the grid telemetry fingerprint expires. For example, the grid telemetry fingerprint may use grid telemetry data that can change over time.

In some implementations, the grid telemetry fingerprint may be used to verify that data that purports to be from a portion of a grid is actually from that portion of the grid. For example, the signature may be used to secure metrics or other data sent between entities on the grid.

In some implementations, each device (for example, the substation 402, the solar array 404, the consumer 406, and the consumer 408) may have its own unique or quasi-unique device fingerprint based on the electrical characteristics of the device. For example, each computer chip, even if manufactured in the same plant, has a different consumption signature, load signature, etc. . . . Accordingly, each device may be distinctly identifiable for the purposes of tracking transactions in the distributed ledger. Therefore, a system may be able to determine, after the grid instruction is stored on the distributed ledger that the grid instruction was issued by the substation 402 based on substation 402 registering its device fingerprint with the distributed ledger.

Figure 5:
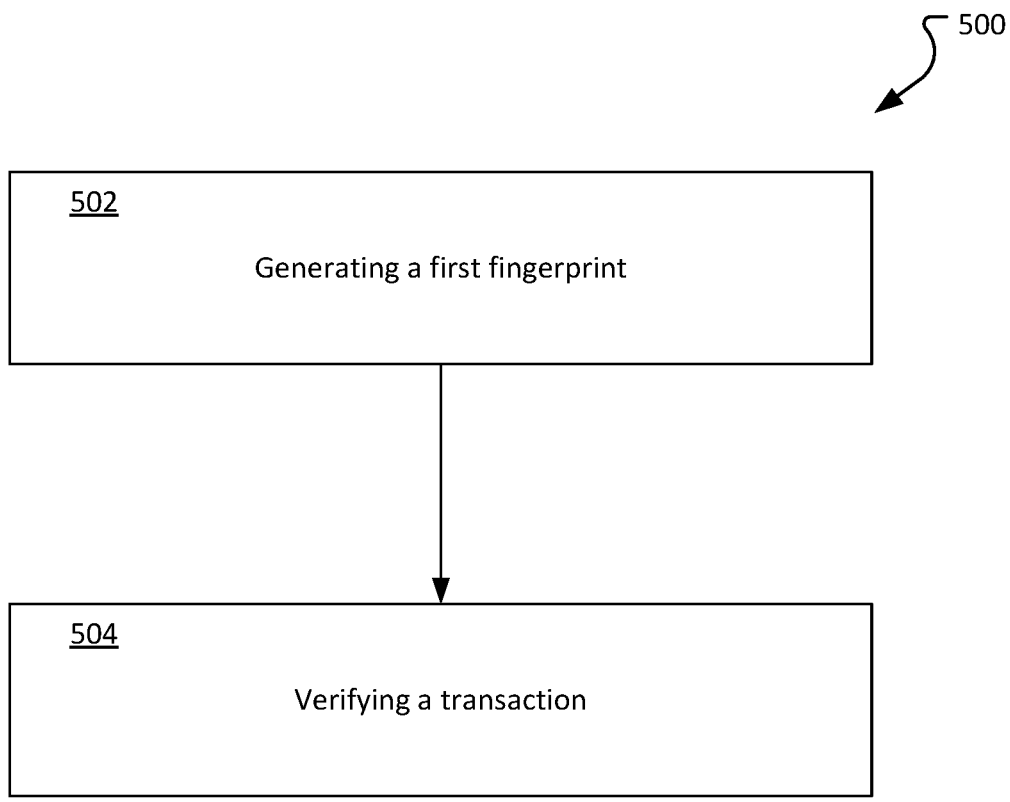
FIG. 5 is a flowchart of an exemplary process for verifying a transaction.

FIG. 5 is a flowchart of an exemplary process for verifying a transaction. The process 500 can be performed by a computer system, or specialized hardware integrated with devices connected to an electric grid.

The process 500 generates 502 a grid telemetry fingerprint. The grid telemetry fingerprint may be generated using grid telemetry information as described above, for example, using voltage, phase angle differences, reactive power information, and/or changes to grid inertia. In some implementations, the process 500 may generate the grid telemetry fingerprint in response to an entity attempting to place a transaction on a distributed ledger (for example, a block chain). In some implementations, the grid telemetry fingerprint may be generated periodically so that it is available for use as needed.

The process 500 verifies 504 a transaction. The transaction may have been applied to a distributed ledger and is associated with the grid telemetry fingerprint. The process 500 may compare the grid telemetry fingerprint associated with the transaction with the grid telemetry fingerprint generated as part of the process 500.

In some implementations, if the grid telemetry fingerprint associated with the transaction matches the grid telemetry fingerprint generated as part of the process, the process 500 approves the transaction. It's useful to note that approval of the transaction by the process 500 does not necessarily mean that the transaction is approved to be applied to the distributed ledger, instead, approval to add a transaction to the distributed ledger may be determined based off of many systems executing a similar process.

In some implementations, if the grid telemetry fingerprint associated with the transaction does not match the grid telemetry fingerprint generated as part of the process, the process rejects the transaction. In some implementations, a single process rejecting the transaction may be sufficient to have the transaction excluded from the distributed ledger. In some implementations, excluding the transaction from the block chain may be determined based on several processes operating on different systems In circumstances where a significant number of systems reject the transaction (for example, one process, two processes, three processes, a majority of the processes, etc.) the system that submitted the transaction may be temporarily or permanently barred from sending future transactions. Alternatively, the systems that submit the transaction may need to be cleared or re-approved before it can submit additional transactions (for example, by a systems administrator, grid operator, etc.)

Figure 6:
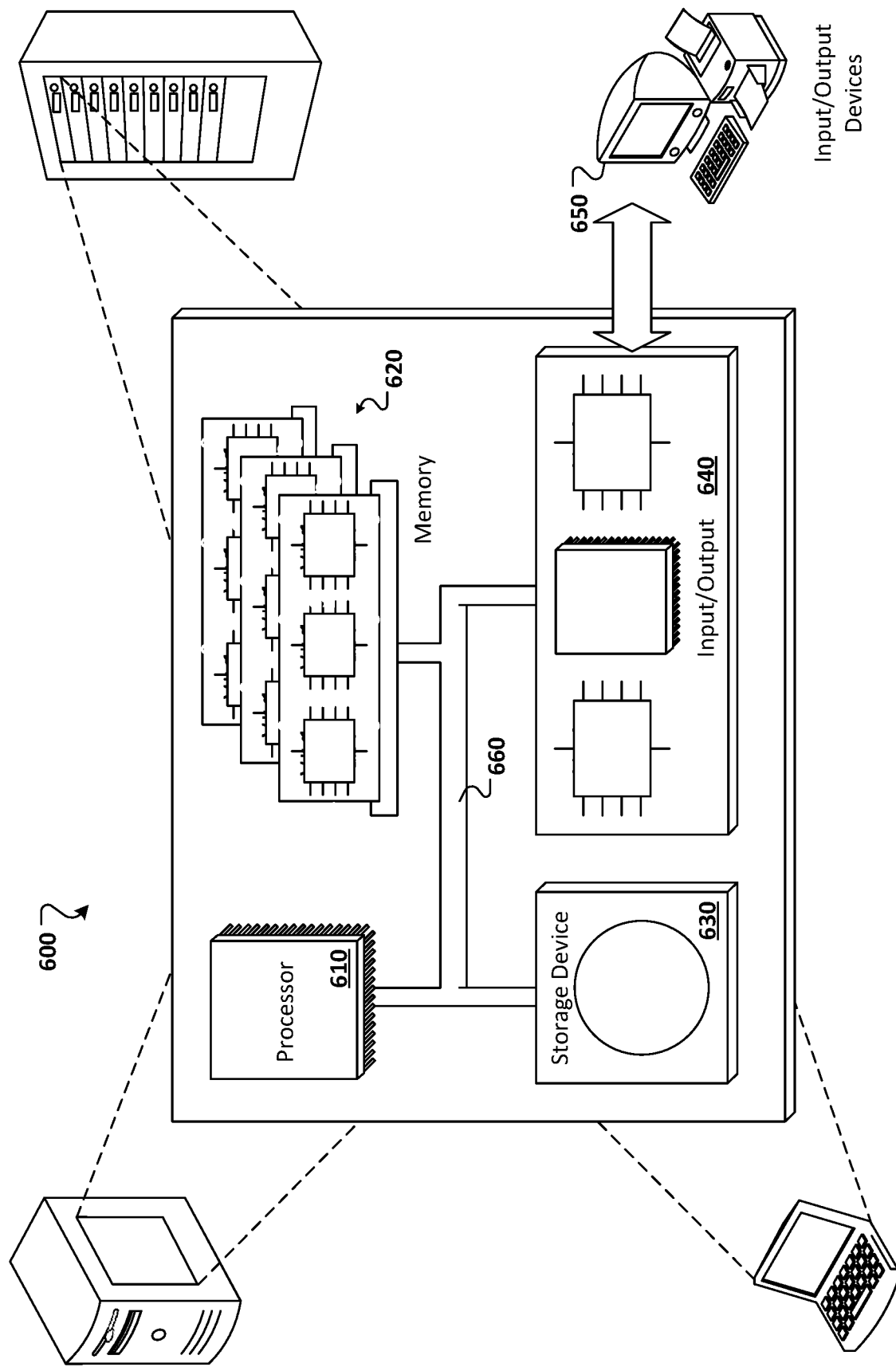
FIG. 6 depicts an example computing system.

FIG. 6 depicts an example computing system, according to implementations of the present disclosure. The system 600 may be used for any of the operations described with respect to the various implementations discussed herein. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks, such as the network(s) 110, using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method comprising:
   generating a grid telemetry fingerprint based on characteristics of an electrical grid at a grid connection point;
   generating a device telemetry fingerprint based on electrical characteristics of a computing device connected to the electrical grid at the grid connection point;
   determining physical presence of the computing device at the grid connection point by correlating the device telemetry fingerprint with the grid telemetry fingerprint; and
   restricting operations of a digital system executing on the computing device based on the determined physical presence.

2. The method of claim 1, wherein determining physical presence comprises:
   comparing the grid telemetry fingerprint with expected characteristics of the grid connection point; and
   verifying that fluctuations in the device telemetry fingerprint correspond to fluctuations in the grid telemetry fingerprint.

3. The method of claim 1, wherein generating the grid telemetry fingerprint comprises measuring at least one of: voltage, a phase angle difference, reactive power, and change in grid inertia at the grid connection point.

4. The method of claim 1, wherein the digital system comprises software code executing on the computing device, and wherein restricting operations comprises:
   establishing operational boundaries for the software code based on the determined physical presence of the computing device.

5. The method of claim 4, further comprising:
   identifying a jurisdiction associated with the grid connection point; and
   applying jurisdiction-specific operational constraints to the software code.

6. The method of claim 1, wherein generating the device telemetry fingerprint comprises:
   measuring electrical characteristics of the computing device at multiple operating states; and
   detecting variations in the electrical characteristics that uniquely identify the computing device.

7. The method of claim 1, further comprising:
   recording a reference grid telemetry fingerprint and a reference device telemetry fingerprint during a trusted initialization state; and
   determining whether the computing device has been physically relocated by comparing current fingerprints to the reference fingerprints.

8. The method of claim 1, further comprising:
   detecting an attempt to spoof either the grid telemetry fingerprint or the device telemetry fingerprint; and
   disabling functionality of the digital system when spoofing is detected.

9. The method of claim 1, further comprising:
   generating a cryptographically secured attestation that includes both the grid telemetry fingerprint and the device telemetry fingerprint; and
   providing the attestation to verify the physical presence of the computing device.

10. The method of claim 1, wherein restricting operations comprises:
    determining whether the computing device is physically located within an authorized jurisdiction; and
    preventing access to specific data when the computing device is not physically located within the authorized jurisdiction.

11. The method of claim 1, further comprising:
    detecting a change in the grid telemetry fingerprint that indicates the computing device has been connected to a different section of the electrical grid; and
    generating an alert regarding the change in physical location.

12. The method of claim 1, wherein the device telemetry fingerprint is generated by a secure hardware component within the computing device that is resistant to tampering.

13. The method of claim 1, wherein determining physical presence comprises:
  verifying that the computing device is physically present at the grid connection point with a confidence level that meets a predetermined threshold; and
  adjusting permitted functionality of the digital system based on the confidence level.

14. The method of claim 1, further comprising:
  recording the grid telemetry fingerprint, the device telemetry fingerprint, and verification results to a distributed ledger to create an immutable record of the physical presence determination.

15. The method of claim 1, wherein restricting operations comprises implementing export control policies by:
  determining whether the grid connection point is located within an authorized national boundary; and
  controlling access to export-restricted functionality based on the determination.

16. A system comprising:
  one or more computers and one or more storage devices storing instructions that are operable, when executed by the one or more computers, to cause the one or more computers to perform operations comprising:
  generating a grid telemetry fingerprint based on characteristics of an electrical grid at a grid connection point;
  generating a device telemetry fingerprint based on electrical characteristics of a computing device connected to the electrical grid at the grid connection point;
  determining physical presence of the computing device at the grid connection point by correlating the device telemetry fingerprint with the grid telemetry fingerprint; and
  restricting operations of a digital system executing on the computing device based on the determined physical presence.

17. A non-transitory computer storage medium encoded with computer program instructions that when executed by one or more computers cause the one or more computers to perform operations comprising:
  generating a grid telemetry fingerprint based on characteristics of an electrical grid at a grid connection point;
  generating a device telemetry fingerprint based on electrical characteristics of a computing device connected to the electrical grid at the grid connection point;
  determining physical presence of the computing device at the grid connection point by correlating the device telemetry fingerprint with the grid telemetry fingerprint; and
  restricting operations of a digital system executing on the computing device based on the determined physical presence.

* * * * *